May 11, 1948.   J. JANDASEK   2,441,490
TRANSMISSION
Filed March 31, 1944
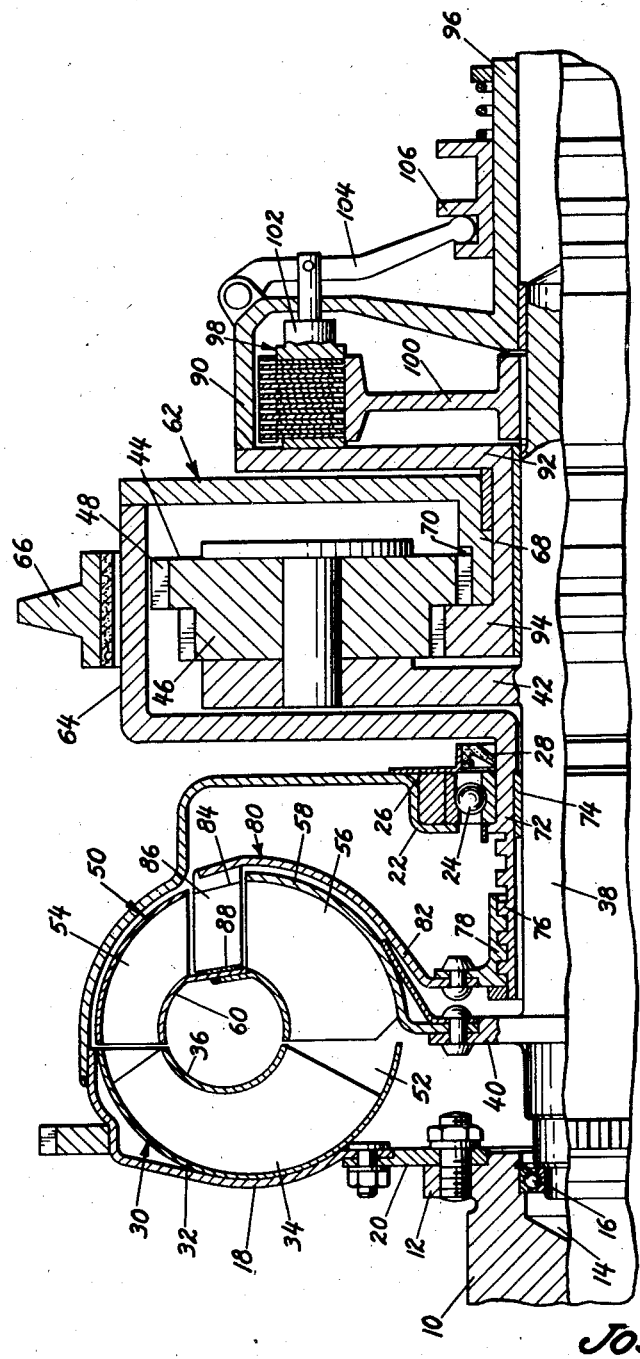
INVENTOR.
JOSEPH JANDASEK
BY
*O. H. Fowler*
ATTORNEY.

Patented May 11, 1948

2,441,490

UNITED STATES PATENT OFFICE 2,441,490

TRANSMISSION

Joseph Jandasek, Detroit, Mich., assignor to Bendix Aviation Corporation, Detroit, Mich., a corporation of Delaware Application March 31, 1944, Serial No. 528,890

5 Claims. (Cl. 74—89.5)

1

This invention relates to transmissions, and more particularly to combined fluid and mechanical transmissions.

Briefly, the invention comprehends a transmission including a fluid transmission and a mechanical transmission, each operative to develop torque during a normal operation of the transmission.

An object of the invention is to combine a fluid transmission having an impeller, a turbine, and a reaction member, automatically movable into and out of the fluid circuit of the transmission so as to operate the transmission as a torque converter or as a fluid coupling, with a mechanical transmission operative to develop torque during both stages of operation of the fluid transmission, and selective control means for the mechanical transmission whereby the mechanical transmission may be operated to develop torque, or locked to rotate as a single unit in unison with the turbine and the reaction member of the fluid transmission.

Other objects and advantages of the invention will appear from the following description taken in connection with the drawing forming a part of this specification, and in which,—

The single figure is a longitudinal view, partly in section and partly broken away, of a transmission embodying the invention.

Referring to the drawing for more specific details of the invention, 10 represents a driving shaft having a conventional flange 12, and a concentrically disposed recess 14 supporting a bearing 16. A rotatable housing 18 has a concentrically disposed annular part for the reception of a mounting ring 20 bolted or otherwise secured to the housing and to the flange 12 of the shaft 10. The housing also has a bearing support 22 oppositely disposed with relation to the mounting ring for the reception of a bearing 24, and a retaining ring 26 suitably secured to the housing serves to hold the bearing 24 against displacement and also to support a sealing ring 28 for inhibiting seepage of fluid from the housing.

An impeller, indicated generally at 30, is fixedly secured to the inner wall of the housing. The impeller includes an outer shroud 32 having arranged thereon a plurality of equi-spaced blades 34 supporting an inner shroud 36.

2

A center shaft 38 journaled on the bearing 16 has thereon a flange 40 and a relatively large flange 42, the latter having mounted thereon for rotation spaced pairs of pinions indicated generally at 44, including a small pinion 46 and a relatively large pinion 48, the purpose of which will hereinafter appear. The flange 40 supports a turbine, indicated generally at 50, providing in conjunction with the impeller 30 a toroidal chamber 52. The turbine is of the two-stage type including a set of vanes 54 constituting the first stage of the turbine, and another set of vanes 56 constituting the second stage of the turbine. The two stages of the turbine are spaced apart. The vanes 56 are arranged on a web 58 supported by the flange 40, and an inner shroud 60 supported by the vanes 56, in turn, supports the vanes 54.

A transmission housing 62 journaled on the center shaft 38 is provided with a braking surface 64 for the reception of the friction element, a brake shoe 66 adapted to be activated in any conventional manner. The transmission housing 62 has an inwardly extended sleeve 68 fitted over the center shaft with substantial clearance. The sleeve 68 carries a sun gear 70 in mesh with the large pinion 48. The transmission housing 62 also has an external sleeve 72 supported for rotation on a suitable bearing 74 on the center shaft. The sleeve 72 extends through the bearing 24 and the fluid seal 28 into the housing 18, and is externally threaded, as indicated at 76.

A carrier 78 is mounted for travel on the threads 76 on the sleeve 72 and supports a reaction member indicated generally at 80. The reaction member includes a spider or web 82 fixedly secured to the carrier 78, and the spider carries a web 84 having arranged thereon a plurality of equi-spaced reaction vanes 86 supporting an inner shroud 88.

A clutch housing 90 has an external sleeve 92 slipped over the center shaft 38. The sleeve 92 extends between the center shaft 38 and the internal sleeve 68 of the housing 62 into the housing 62, and the sleeve 92 has thereon a sun gear 94 in mesh with the small pinion 46. The housing 90 also has an external sleeve 96 journaled on the center shaft as by a bearing, and the sleeve 96 is adaptable for the reception of a driven shaft, not shown. A clutch indicated generally at 98, for connecting the center shaft to the driven shaft, in enclosed in the housing 90. The clutch includes an element 100 keyed to the center shaft, and adapted for cooperation with another element 102 carried by the housing. The clutch element 102 is activated by a lever 104 pivoted on the housing 90 and suitably connected to a slidable collar 106 on the sleeve 96, and the slidable collar is actuated by a conventional shift rod, not shown.

In a normal operation, torque transmitted from a prime mover to the driving shaft 10 results in driving the impeller 30 and thus energizing fluid in the toroidal chamber 52. The energy of the fluid is absorbed by the vanes 54 and 56, constituting the first and second stages of the turbine 50, and on the faces of the vanes 86 of the reaction member 80, resulting in rotation of the turbine 50 and a rapid movement of the reaction member on the threaded portion 76 of the sleeve 72, completely introducing the reaction vanes 86 into the toroidal chamber 52 so as to provide torque multiplication.

Under this condition, power flows from the turbine through the centershaft 38 to the planetary transmission, and at this stage of operation, upon applying the brake 66 to hold the housing 62 of the planetary transmission and the sun gear 70 thereon against movement, power flow through the planetary transmission by way of pinion 48 in mesh with sun gear 70, which, being locked, functions as a mechanical reaction member, through the pinion 46 and the sun gear 94 to the housing 90 and sleeve 96 supported thereby for the reception of the driven shaft, not shown, with increased torque multiplication and relatively slow output speed.

When a predetermined speed of operation is attained and torque multiplication is no longer required, the direction of fluid flow in the toroidal chamber 52 changes, and the fluid impinges on the backs of the reaction vanes 86, causing rapid movement of the reaction member 80 on the sleeve 72 to substantially retract the reaction vanes 86 from the toroidal chamber, and thereafter the fluid transmission functions as a fluid coupling.

When higher speed is desired, the brake 66 is released and the clutch 98 immediately applied. This results in directly coupling the center shaft 38 supporting the turbine 50 to the housing 90 supporting the sleeve 96, so as to approach a one-to-one ratio for the transmission. When the center shaft 38 is so coupled to the sleeve 96, the gears of the transmission are locked and the transmission, including the housing 62, the mechanical reaction gear 70, and the fluid reaction member 80, rotates as a single unit in unison with the turbine 50.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a power transmitter including a fluid transmission and a mechanical transmission, a housing for the mechanical transmission, a sun gear on the housing serving as a reaction member for the mechanical transmission, a reaction member for the fluid transmission mounted for travel on the housing, an intermediate shaft driven by the fluid transmission, a sleeve around the intermediate shaft having a driving means at one end and a sun gear at the other end, a flange on the intermediate shaft carrying two integral pinion gears mounted for rotation thereon and in mesh with the two sun gears, and means for locking the housing against rotation.

2. In a power transmitter including a fluid transmission and a mechanical transmission, a housing for the mechanical transmission, an intermediate shaft having thereon a flange, and driven by the fluid transmission, two integral pinion gears varied in size within the housing, and mounted for rotation on the flange, a small sun gear mounted on the housing and adapted to engaged the larger of the pinion gears a sleeve around the intermediate shaft having a driving attachment at one end and a large sun gear at the other end and adapted to engage the smaller of the pinion gears, a reaction member for the fluid transmission mounted for travel on the housing of the mechanical transmission, and friction means for locking movement of the mechanical transmission housing.

3. In a transmission, a drive shaft, a center shaft, and a driven member, a fluid transmission having an impeller on the drive shaft and a turbine on the center shaft, a mechanical transmission comprising a small pinion gear integrally related with a large pinion gear, said gears being supported for rotation on a flange of the center shaft, a housing for the gears, a small sun gear on the housing adapted to mesh with the large pinion gear, a reaction member for the fluid transmission mounted for travel on the housing, means for preventing rotation of the housing, a clutch housing having a clutch adapted to connect the center shaft to the driven member for direct drive, and a large sun gear on the clutch housing adapted to mesh with the small pinion gear of the mechanical transmission.

4. In a transmission, a drive shaft, a center shaft, and a driven member, a fluid transmission connecting the driven shaft and the center shaft, a mechanical transmission driven by the fluid transmission comprising two integral pinion gears varied in size mounted for rotation on a flange of the center shaft, a housing for the mechanical transmission, a sun gear on the housing adapted to engage the larger pinion gear, a reaction member for the fluid transmission mounted for travel on the housing, means for restraining movement of the housing, a clutch housing having two sleeves, one sleeve secured to the driven member and the other having a sun gear adapted to engage the smaller pinion gear of the mechanical transmission, a clutch element in the clutch housing secured to the center shaft, another clutch element secured to the clutch housing, and means for locking the clutch elements together.

5. In a transmission, a drive shaft, a center shaft, and a driven member, a fluid transmission adapted to connect the drive shaft and the center shaft including an impeller on the drive shaft and a multi-staged turbine on the center shaft providing in conjunction with the impeller a fluid circuit, a mechanical transmission driven by the fluid transmission comprising two integral pinion gears varied in size mounted for rotation on a shaft supported by a large flange of the center shaft, a housing for the mechanical transmission, a sun gear carried by the housing adapted to engage the larger pinion gear of the mechanical transmission, a reaction member for the fluid transmission mounted for travel on the housing to enable movement of said member out of and into the fluid circuit, braking means to prevent rotation of the mechanical transmission housing, a clutch housing sleeved on the driven member and secured thereto, an oppositely disposed sleeve on the clutch housing, a sun gear on said sleeve adapted to engage the smaller pinion gear of the mechanical transmission, a clutch element in the clutch housing keyed to the center shaft, another clutch element secured to the clutch housing, and means for locking the clutch elements together.

JOSEPH JANDASEK.

REFERENCES CITED

The following references are of record in the file of this patent:

UNITED STATES PATENTS

| Number | Name | Date |
| --- | --- | --- |
| 2,308,547 | Schneider | Jan. 19, 1943 |
| 2,351,213 | James | June 13, 1944 |
| 2,351,553 | Simpson | June 13, 1944 |

FOREIGN PATENTS

| Number | Country | Date |
| --- | --- | --- |
| 442,330 | Great Britain | Feb. 5, 1936 |